March 10, 1931.  S. S. A. WATKINS  1,795,626
CAMERA
Filed May 14, 1927
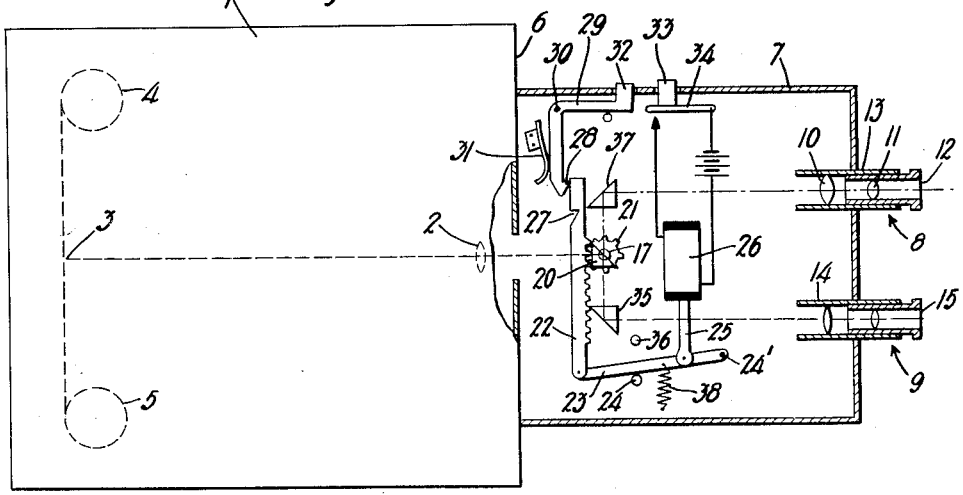

Patented Mar. 10, 1931

1,795,626

UNITED STATES PATENT OFFICE

STANLEY S. A. WATKINS, OF RYE, NEW YORK, ASSIGNOR, BY MESNE ASSIGNMENTS, TO ELECTRICAL RESEARCH PRODUCTS, INC., A CORPORATION OF DELAWARE

CAMERA

Application filed May 14, 1927. Serial No. 191,420.

This invention relates to photographic cameras and more particularly to a camera which is capable of taking pictures of distant and nearby scenes.

The invention finds its most practical application in connection with a motion picture camera which, in the course of taking a scenario, is required to take distant views as well as close-ups, these being technically termed "long shots" and "short shots," respectively. As is well known in the technique of motion picture photography involving the taking of a comparatively long scenario, it is frequently necessary to take "long shots" and "short shots" in extremely rapid succession. Heretofore this situation in some cases was met by using two distinct cameras, one adjusted for "long shots" and the other for "short shots." This procedure, of course, necessitated the using of separate films and the consequent cutting out and patching together of the various shots in their proper order.

It is an outstanding feature of the present invention to provide a camera which is capable of taking "long shots" and "short shots" in comparatively instantaneous succession.

A feature of the invention relates to a device which may be attached to the ordinary motion picture camera whereby the latter is enabled to function successively and expeditiously in the taking of "long shots" and "short shots." A further feature pertains to an optical system comprising a movable mirror together with electromagnetic means for moving said mirror to enable an ordinary camera to take long and short shots in rapid succession.

Other features and advantages of the invention which are not specifically enumerated will become obvious after a consideration of the following description and as pointed out in the appended claims.

The invention is shown in the several figures of the drawing partially in detail and partially in diagrammatic form, as applied to any well-known type of camera either of the motion picture or stationary types. It will be understood, however, that the specific organization of elements disclosed does not mark the confines of the invention, but that the same is susceptible of other embodiments and organizations which will be apparent to those familiar with the art to which the invention appertains.

For the purpose of description and for showing one manner in which the inventive concept may find a particular embodiment, Fig. 1 of the drawing shows a schematic representation of the invention applied to a motion picture camera and employing a rotating prismatic mirror;

Fig. 2 is a schematic representation of the light path with the rotating prismatic mirror of Fig. 1 in an alternate position;

Fig. 3 shows diagrammatically another embodiment of the invention employing two longitudinally movable prismatic mirrors; and Fig. 4 shows a detail of one manner of mounting the prismatic mirrors.

Fig. 5 shows a further embodiment of the invention.

Referring to Fig. 1 of the drawing, the numeral 1 indicates diagrammatically any standard form of motion picture camera having the usual optical system represented by the lens 2. The numeral 3 indicates the sensitized film which is fed through the camera at the proper speed by known means, 4 and 5 representing the supply and take-up reels, respectively. Mounted on the front wall 6 of the motion picture camera in a suitable manner is the dark box 7, which carries in the right-hand face thereof the optical systems 8 and 9. The optical system 8 comprises any well-known combination of lenses represented by the lenses 10 and 11, which are preferably mounted in the well-known manner in respective telescoping tubes 12 and 13. Lenses 10 and 11 in combination with the camera lens are designed to project on the film 3 clear images of nearby objects and correspond in general to the optical systems of so-called close-up cameras. It is understood, however, that any well-known form of optical system may be used for taking close-up views, and that by means of the adjustable telescoping arrangement shown, the size of the close-up image projected by the lenses 10 and 11 may be regulated. Similarly, well known forms of centering and image locating devices may be incorporated within the camera proper.

For the purpose of taking pictures of distant scenes a similar optical system 9 is provided. It will be understood that the lens design of the optical system 9 is different from that of the system 8. However, the design of this portion of the apparatus does not form any feature of the present invention and any well-known type of lens system may be employed for the purpose of projecting upon the film 3 clear images of distant objects. Additional adjustment is provided by means of the telescoping tubes 14 and 15, whereby the size of the image on the film may be regulated. Journalled in suitable bearings on the interior of the dark box 7 is a shaft formed of two sections 17 and 18 (Fig. 4), each section carrying a flange 19. Mounted between flanges 19 and centrally disposed with relation to the lens 2 is the prismatic mirror 20 which is preferably of the total reflecting type. Any convenient means for mounting and securing the mirror 20 between the flanges 19 may be employed. The particular form of mounting shown in Fig. 4 presents no impediment to the passage of the light rays from the respective optical systems 8 and 9 to the motion picture camera proper. For this purpose the flanges are preferably threaded on the end of the respective shaft sections so that by turning these flanges the prism 20 may be securely clamped in position. The prism is so mounted that the central element of its reflecting face is in alignment with the axes of shaft sections 17 and 18. The shaft section 18 carries the pinion 21 which engages the teeth of the vertically movable rack 22. Pivotally attached to the lower end of rack 22 is the lever 23, which in turn is pivoted for rotation about the fixed point 24'. Intermediate the ends of the lever 23 is fastened one end of the plunger 25 which is adapted to be raised by the electromagnet 26 against the tension of spring 38. The upper end of rack 22 is provided with a notch 27 which, when the rack is in its uppermost position, engages the latch-like projection 28 on the crank member 29. Member 29 is pivoted for movement around the point 30 and the latched end of this member is normally pressed into engagement with the rack 22 by means of spring 31. For the purpose of removing the latch 28 from engagement with notch 27, the member 29 is provided with a button extension 32 which projects through an opening in the side wall of the box 7 at a point convenient for manipulation by the photographer. Adjacent to the button 32 is a second button 33 which, when pressed, is adapted to close a circuit through the movable contact 34 and the winding of magnet 26.

In Fig. 1 of the drawing the apparatus is shown in its normal position wherein magnet 26 is deenergized. Because of the retractile effort of spring 38, plunger 25 and rack 22 are maintained in their lowermost positions with lever 23 resting against the lower stop post 24, with prismastic mirror 20 in the position shown. For the purpose of reflecting the light passed by the optical systems 8 and 9 upon the mirror 20, two fixed prism mirrors 35 and 37 are provided. These mirrors are mounted in alignment with the reflective optical systems and with the central elements of the reflecting surfaces parallel to and in alignment with the central element of mirror 20. With the apparatus in the condition shown in Fig. 1 the camera is set to take pictures of distant scenes, the path of the light rays being traced through the optical system 9, thence to the reflecting surface of the mirror 35, whence the totally reflected rays pass to the reflecting surface of the prism 20. The rays reflected from prism 20 pass thence to the optical system of the camera 1 and impinge upon the film 3. When it is desired to take close-up pictures or "short shots," the photographer momentarily depresses button 33 to energize magnet 26, whereby plunger 25 and rack 22 are raised to their uppermost position with lever 23 pressing against the stop post 36. During the upward movement of rack 22, pinion 21 and prism 20 are rotated in a clockwise direction until the lever 23 abuts against the stop post 36. Prism 20 is then in the position indicated schematically in Fig. 2. Tooth 28 of the lever 29 is now in engagement with the notch 27 in rack 22 and maintains the prism 20 in its set position. The path of the light rays as shown in Fig. 2 may then be traced through the optical system 8 to the reflecting surface of the prism mirror 37, thence to the mirror 20 whence they are reflected through the optical system of the camera 1. When it is desired to again take a "long shot," the photographer depresses button 32 which causes the latch 28 to disengage the notch 27, and the rack 22 is drawn downwardly by spring 38 to rotate pinion 21 in a counter-clockwise direction.

Fig. 3 illustrates another embodiment of the invention wherein two separate movable mirrors 39 and 40 are provided in place of the single mirror 20 shown in Fig. 1. Mirrors 39 and 40 are attached in any suitable manner to the rod 41 which extends transversely across the dark box 7. The left-hand end is provided with the adjusting knob 42 by means of which the rod may be moved to bring the mirrors 39 and 40 alternately into alignment with the optical system of the camera 1.

As shown in Fig. 3 the upper optical system 8 is effective upon the film in the camera 1 and the light rays passing through the system 8 reach the mirror 37 and pass thence to the reflecting surface of the mirror 39. The rays reflected from mirror 39 enter the central opening in the camera 1 and impinge upon the sensitized film. When it is desired to use the camera for "long shots" the rod 41 is moved to the right until the projection 43 engages the stop post 44. Under this condition the mirror 40 alone is in optical alignment with the "long shot" optical system 9 and the optical system of the camera. If desired, instead of moving the rod 41 manually a button and electromagnet similar to magnet 26 and button 33 of Fig. 1 may be provided, the plunger of magnet 26 serving to actuate the sliding rod.

Fig. 5 of the drawing shows a manner in which two separate cameras may be employed for the purpose of taking in succession on a single film long shots and short shots. In this figure numeral 45 indicates any well known form of motion picture camera with an adjustable optical system 46 suitable for taking long shots. Mounted adjacent to and above camera 45 is a second camera 47 equipped with a short shot optical system 48. Each of the cameras 45 and 47 is provided with an opening 49 which register with each other and through which the moving film 50 is passed from one camera to the other. Each of the cameras is provided with a suitable shutter 51, 52. When it is desired to take long shots on film 50 the shutter 51 is opened either manually or by suitable electrical means while shutter 52 is closed. Conversely when short shots are to be taken shutter 51 is closed and shutter 52 is opened. When it is desired to again take long shots the operator closes both shutters and advances the film 50 to present an unexposed portion thereof to the optical system 46 whereupon the shutter 51 may be opened and the long shots taken. This procedure of advancing the film between the taking of shots is not necessary when short shots are to be taken after long shots since double exposure does not occur under these circumstances.

While in the foregoing prism mirrors have been described, it is understood that the invention contemplates the use of plane mirrors for reflecting purposes. It is also obvious that various modifications may be made in the organization and arrangement disclosed without departing from the spirit of the invention as particularly defined in the appended claims.

What I claim is:

1. In combination, a photographic camera, a dark box attached to the front wall of said camera, said dark box containing long shot and short shot optical systems, a movable mirror within said dark box normally positioned to reflect rays from said long shot optical system alone through said camera, electromagnetic means for rotating said mirror from its normal to an alternate position, said mirror in its alternate position adapted to reflect rays from said short shot optical system alone through said camera.

2. Means for enabling a photographic camera to be used rapidly in succession for long shots and short shots comprising long shot and short shot optical systems, a light reflecting means adapted to reflect light from either of said optical systems through said camera, means for normally maintaining said last mentioned means in position to reflect light from said long shot optical system alone, electromagnetically operated means for adjusting said reflecting means to reflect light from said short shot optical system alone, means for locking said adjusting means in adjusted position, and means for releasing said locking means to allow said reflecting means to be restored to its normal position.

3. Means for enabling a photographic camera to be used rapidly in succession for long shots and short shots comprising a long shot and short shot optical systems, a mirror adapted in its normal position to reflect light through said camera from said long shot optical system alone, a rotatable shaft on which said mirror is mounted, means comprising an electromagnetically operated rack and pinion for rotating said shaft to bring said mirror to an alternate position whereby light rays from said short shot optical system alone are reflected through said camera.

4. Means for enabling a photographic camera to be used for long shots and short shots in rapid succession, comprising long shot and short shot optical systems, light reflecting means common to said optical systems and said camera reflecting means having a plurality of positions, means for normally maintaining said reflecting means in one position to effectively associate said short shot system with said camera, and means for moving said reflecting means to another position to effectively associate said long shot system with said camera.

In testimony whereof, I have signed my name to this specification this 10th day of May, 1927.

STANLEY S. A. WATKINS.